United States Patent
Pang

(10) Patent No.: US 6,953,311 B2
(45) Date of Patent: Oct. 11, 2005

(54) TOOL HOLDING AND WORKING PIECE-CLAMPING ASSEMBLY FOR A MACHINE TOOL

(75) Inventor: Hua-Chang Pang, Taichung Hsien (TW)

(73) Assignee: KSI Technologies Corp., Taichung Hsien (TW)

( * ) Notice: Subject to any disclaimer, the term of this patent is extended or adjusted under 35 U.S.C. 154(b) by 224 days.

(21) Appl. No.: 10/650,239

(22) Filed: Aug. 27, 2003

(65) Prior Publication Data

US 2005/0046100 A1 Mar. 3, 2005

(51) Int. Cl.⁷ .................................................. B23B 5/10
(52) U.S. Cl. ........................ 409/216; 219/647; 269/244
(58) Field of Search ................... 409/218, 232, 409/233, 234; 219/647, 658, 659, 676; 269/244

(56) References Cited

U.S. PATENT DOCUMENTS

| | | | |
|---|---|---|---|
| 1,811,299 A | * | 6/1931 | Brockhaus, Jr. ............. 269/242 |
| 2,274,428 A | * | 2/1942 | Odin ........................... 269/244 |
| 3,650,522 A | * | 3/1972 | Wermuth et al. ........... 269/244 |
| 4,380,484 A | * | 4/1983 | Repik et al. ................. 219/659 |
| 5,192,062 A | * | 3/1993 | Berchtold .................... 269/244 |
| 5,623,757 A | * | 4/1997 | Durfee, Jr. ................... 269/244 |
| 5,975,511 A | * | 11/1999 | Bohler ......................... 269/244 |
| 5,984,290 A | * | 11/1999 | Durfee, Jr. ................... 269/244 |

* cited by examiner

Primary Examiner—Derris Banks
Assistant Examiner—Dana Ross
(74) Attorney, Agent, or Firm—Dellett & Walters

(57) ABSTRACT

A tool holding and working piece-clamping assembly has a stand, a driving device, a threaded rod, a rail assembly, a brake post, a working piece-clamping device and a tool holding device. The working piece-clamping device has an upper clamping device slidably connected to the rail assembly and a lower clamping device corresponding to the upper clamping. The working piece-clamping device has a brake electrically connected to a contact switch and slidably mounted on a brake post. The tool holding device is slidably connected to the rail assembly and has a connecting base screwed with the threaded rod. With such an arrangement, only one threaded rod with a driving device is needed to actuate the tool holding device and the working piece-clamping device to operate. Consequently, the consumption of power can be reduced.

10 Claims, 4 Drawing Sheets

TOOL HOLDING AND WORKING PIECE-CLAMPING ASSEMBLY FOR A MACHINE TOOL

BACKGROUND OF THE INVENTION

1. Field of the Invention

The present invention relates to a tool holding and working piece-clamping assembly, and more particularly to a tool holding and working piece-clamping assembly for a machine tool and that has only a single threaded rod for actuating a tool holding device and a working piece-clamping device.

2. Description of Related Art

A machine tool comprises a working piece-clamping device for clamping a working piece and a tool holding device for holding a tool, such as a induction heating device, such that the working piece can be worked to a desired shape or form with the tool. Two threaded rod assemblies with driving devices are needed to respectively actuate the tool holding device and the working piece-clamping device to move to fit with the forming process of the working piece.

However, the cost for mounting two thread rod assemblies in a machine tool is high. In addition, it is needs two power sources applied to the driving device for respectively actuating the threaded rod assemblies to operate, and this will cause excessive power consumption.

To overcome the shortcomings, the present invention tends to provide a tool holding and working piece-clamping assembly to mitigate or obviate the aforementioned problems.

SUMMARY OF THE INVENTION

The main objective of the invention is to provide a tool holding and working piece-clamping assembly that has only one threaded rod with a driving device to reduce the consumption of power. The tool holding and working piece-clamping assembly has a stand, a driving device, a threaded rod, a rail assembly, a brake post, a working piece-clamping device and a tool holding device. The threaded rod is rotatably mounted on the stand and is driven by the driving device. The rail assembly and the brake post are mounted on the stand and are parallel to the threaded rod. The working piece-clamping device has an upper clamping device slidably connected to the rail assembly and a lower clamping device corresponding to the upper clamping device. The working piece-clamping device further has a connecting plate, an upper base, a contact switch and a brake. The connecting plate is connected to the rail assembly, and the upper base is attached to the connecting plate for the upper clamping device being attached to the upper base. The contact switch is mounted on the connecting plate. The brake is electrically connected to the contact switch and is slidably mounted on the brake post. The tool holding device is slidably connected to the rail assembly and has a connecting base, at least one pushing block, an actuating block and a moving base. The connecting base is slidably connected to the rail and is screwed with the threaded rod. The pushing block is mounted on the connecting base and corresponds to the connecting plate. The actuating block is attached to the connecting base and aligns with the actuating arm of the contact switch. The moving base is attached to the connecting base and is located between the upper clamping device and the lower clamping device.

Other objects, advantages and novel features of the invention will become more apparent from the following detailed description when taken in conjunction with the accompanying drawings.

DETAILED DESCRIPTION OF PREFERRED EMBODIMENT

Figure 1:
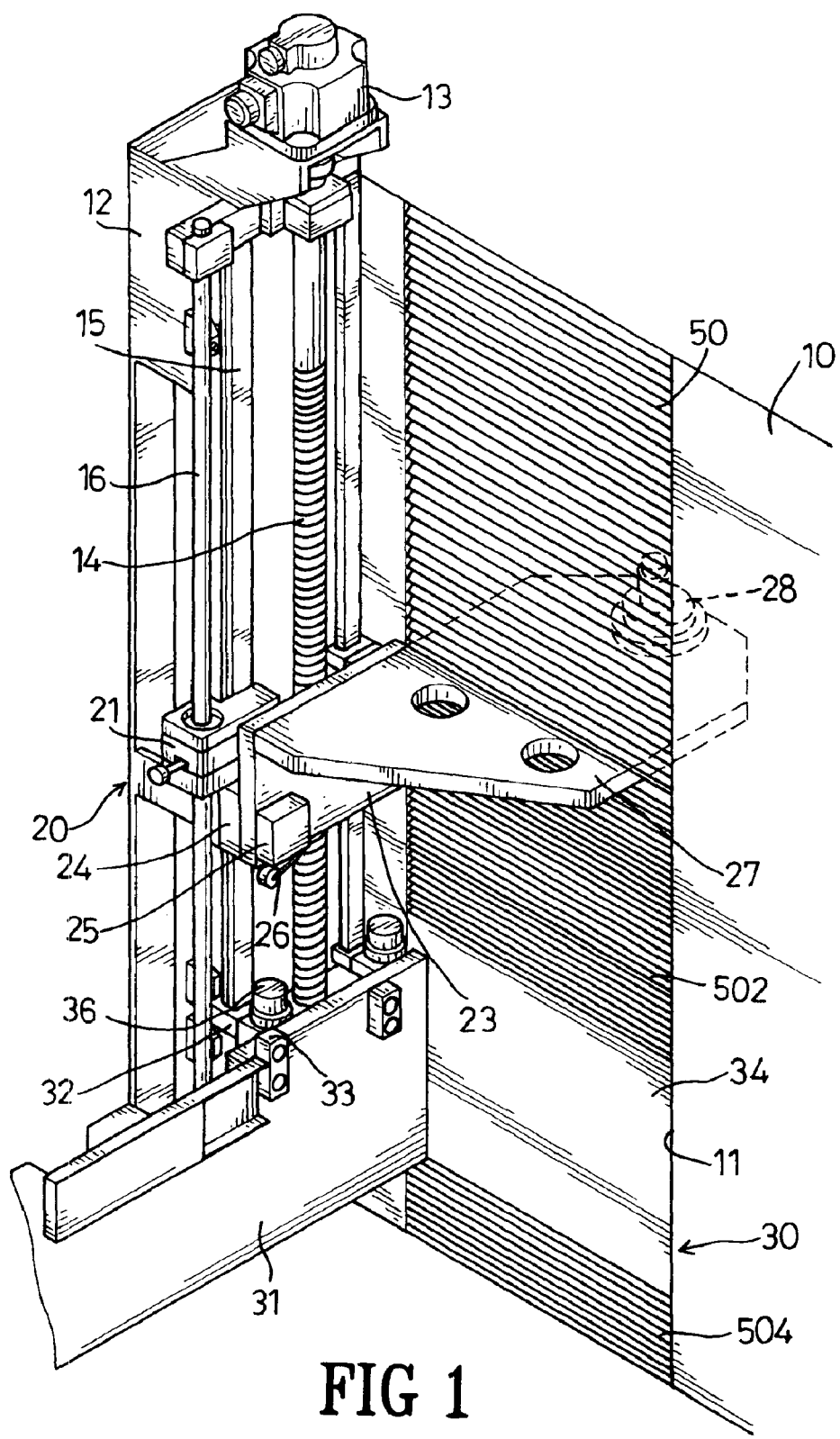
FIG. 1 is a perspective view of a tool holding and working piece-clamping assembly in accordance with the present invention.
Figure 2:
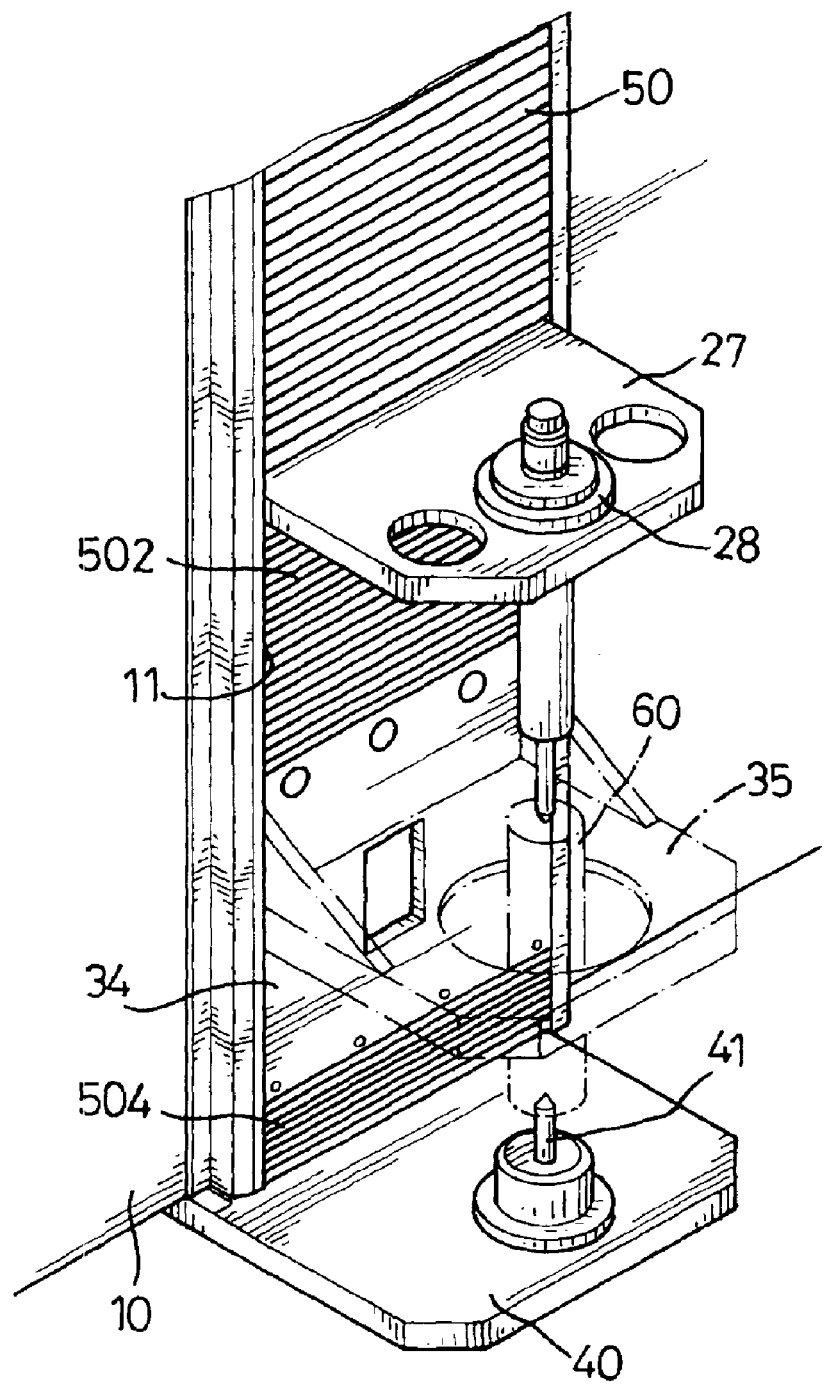
FIG. 2 is a perspective view of the upper clamping device and the lower clamping device of the tool holding and working piece-clamping assembly in FIG. 1.
Figure 3:
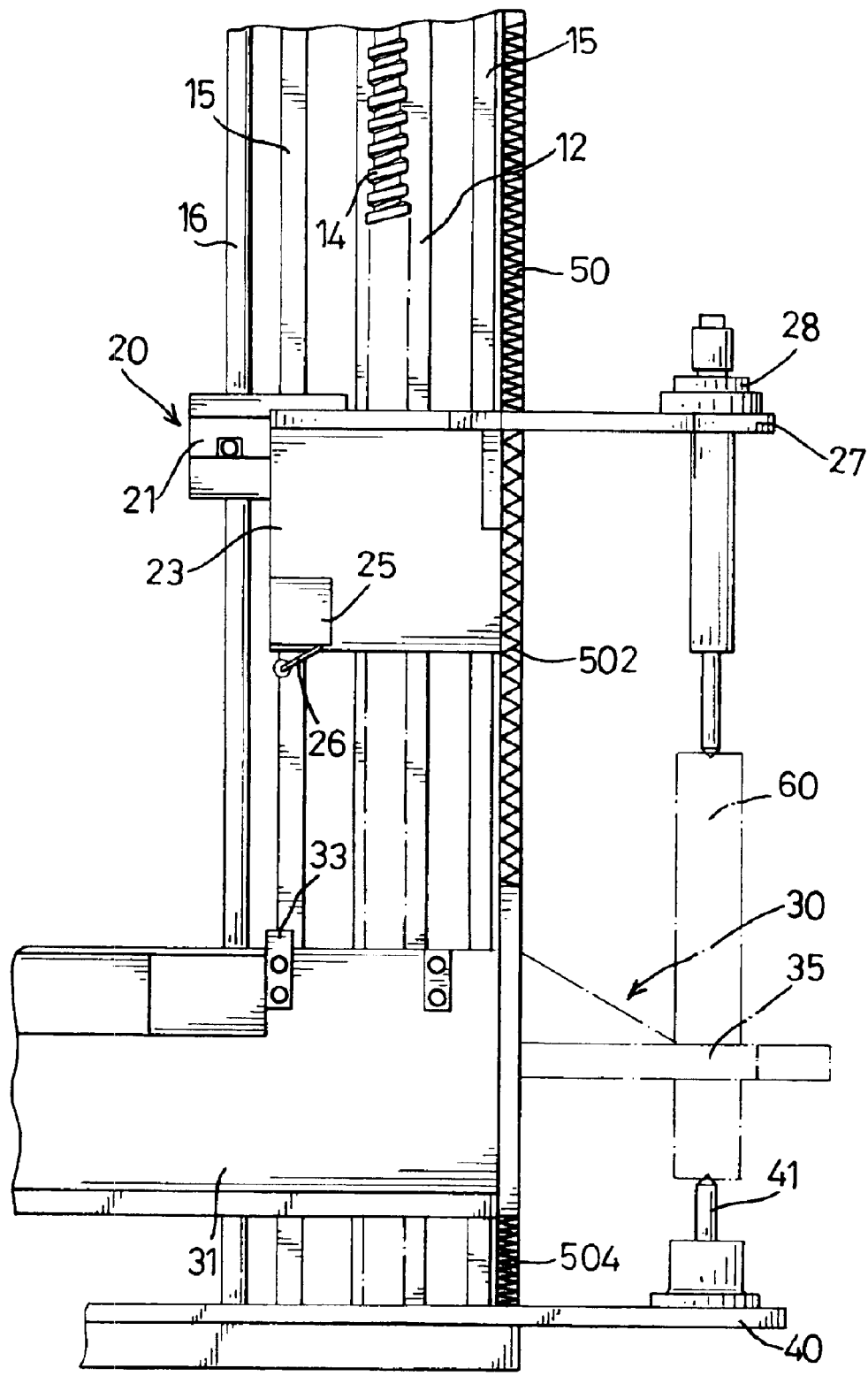
FIG. 3 is a side plan view of the tool holding and working piece-clamping assembly in FIG. 1.

With reference to FIGS. 1 to 3, a tool holding and working piece-clamping assembly for a machine with a tool in accordance with the present invention comprises a stand (12), a driving device (13), a threaded rod (14), a rail assembly, a working piece-clamping device (20) and a tool holding device (30). The stand (12) is securely connected to the machine. In practice, a housing (10) with a window (11) is secured on the machine, and the stand (12) is attached to the housing (10). The driving device (13) is mounted on the top of the stand (12). The driving device (13) can be a motor. The threaded rod (14) is rotatably mounted on the stand (12) and is driven by the driving device (13). The rail assembly is mounted on the stand (12) and is parallel to the threaded rod (14). The rail assembly comprises two rails (15) attached to the stand (12) and respectively located at two sides of the threaded rod (14). A brake post (16) is mounted on the stand (12) and is parallel to the threaded rod (14).

The working piece-clamping device (20) has an upper clamping device (28) and a lower clamping device (41). The upper clamping device (28) is slidably connected to the rail assembly, and the lower clamping device (41) corresponds to the upper clamping device (28) and is securely connected to the housing (10). The working piece-clamping device (20) further comprises a connecting plate (23) connected to the rail assembly. The connecting plate (23) is mounted between two upper sliders (24), wherein each upper slider (24) is attached to one of the rails (15) of the rail assembly, such that the connecting plate (23) is slidably connecting to the rail assembly through the upper sliders (24). An upper base (27) is attached to the connecting plate (23) and the upper clamping device (28) is attached to the upper base (27). The upper base (27) extends through the window (11) in the housing (10). A lower base (40) is attached to the housing (10) for the lower clamping device (41) being mounted on the lower base (40). A contact switch (25) with an actuating arm (26) is mounted on the connecting plate (23). A brake (21) is electrically connected to the contact switch (25) and is slidably mounted on the brake post (16). The brake (21) engages with the brake post (16) until the actuating arm (26) of the contact switch (25) is pushed. With the engagement between the brake (21) and the brake post (26), the upper base (27) with the upper clamping device (28) can be positioned at a desired top level.

The tool holding device (30) is slidably connected to the rail assembly and has a connecting base (31), two pushing blocks (36), an actuating block (33) and a moving base (34). The connecting base (31) is slidably connected to the rails (15) and is screwed with the threaded rod (14). In practice, a lower slider (32) is attached to each respective rail (15) for the connecting base (31) being attached between the lower sliders (32). The pushing blocks (36) are mounted on the connecting base (31) and correspond to the connecting plate (23). The actuating block (33) is attached to the connecting base (31) and aligns with the actuating arm (26) of the contact switch (25). The moving base (34) is attached to the connecting base (31) and is located between the upper clamping device (28) and the lower clamping device (41). The moving base (34) extends through the window (11) in the housing (10), and a tool (35), such as an induction heating device, is mounted on the moving base (34).

In addition, a first bellows shutter (50) has two ends respectively attached to the top end of the window (11) and the upper base (27). A second bellows shutter (502) has two ends respectively attached to the upper base (27) and the moving base (34). A third bellows shutter (504) has two ends respectively attached to moving base (34) and the lower end of the window (11). With the arrangement of the bellows shutters (50,502,504), the driving device (13) and the threaded rod (14) can be separated from the tool (35) and the working piece (60) so as to keep the driving device (13) and the threaded rod (14) from being damaged during the operation of the machine.

Figure 4:
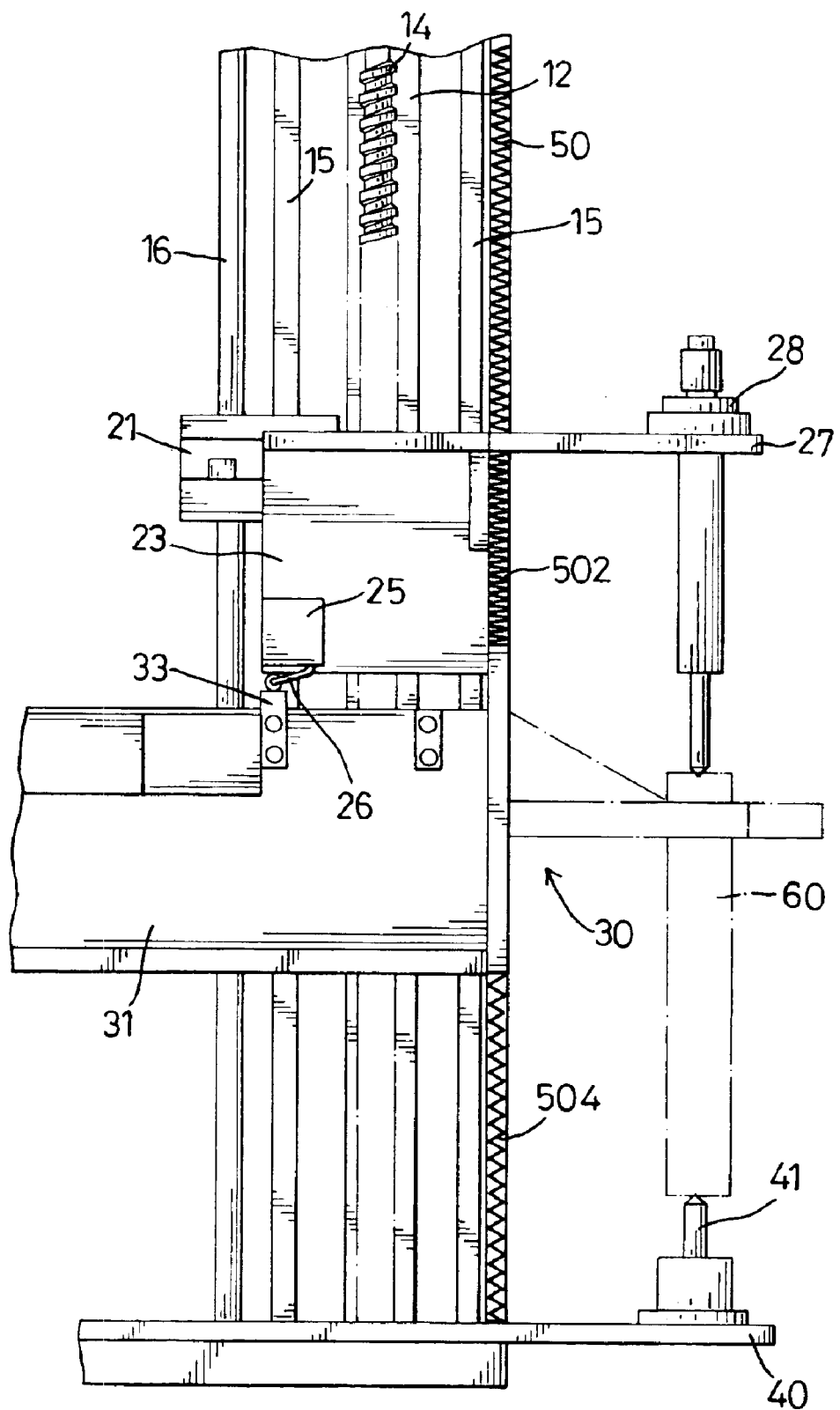
FIG. 4 is an operational side plan view of the tool holding and working piece-clamping assembly in FIG. 1.

With reference to FIGS. 1, 3 and 4, when the driving device (13) is switched on, the threaded rod (14) will be rotated in a direction. The connecting base (31) will be moved upward by the threaded rod (14) along the rails (15). When the actuating block (33) on the connecting base (31) contacts with and pushes the actuating arm (26) of the contact switch (25), the brake (21) will be released. The pushing blocks (36) will push the connecting plate (23) with the upper clamping device (28) to move upward with the connecting base (31). When the upper clamping device (28) moves to a desired high level, the user turns off the driving device (13). Then, a working piece (60) is put on and supported on the lower clamping device (41). The driving device (13) is then turned on to rotate the threaded rod (14) in an opposite direction so as to actuate the connecting base (31) to move downward. The connecting plate (23) with the upper base (27) and the upper clamping device (28) will also move downward due to gravity until the upper clamping device (28) contacts with the working piece (60). During the downward movement of the connecting plate (23), the actuating arm (26) of the contact switch (25) keeps contact with the actuating block (33), such that the brake (21) is kept in a released condition.

When the upper clamping device (28) contacts with the working piece (60), the connecting plate (23) with the upper base (27) and the upper clamping device (28) will stop moving but the connecting base (31) will keep move. When the connecting base (31) keeps moving downward, the actuating block (33) will leave the position where the block (33) pushes the actuating arm (26) of the switch (25). The brake (21) will engage with the brake post (16) so as to keep the upper base (27) with the upper clamping device (28) at the position where the upper clamping device (28) contacts with the working piece (60). Consequently, the working piece (60) is securely held between the upper clamping device (28) and the lower clamping device (41). Accordingly, the working piece (60) can be worked to the desired shape or form with the tool (35) attached to the moving base (34) that moves along the rails (15) by the actuation of the driving device (13) and the transmission of the threaded rod (14).

With such a tool holding and working piece-clamping assembly, only one threaded rod (14) and one driving device (13) are needed. The cost for manufacturing a machine with a tool holding and working piece-clamping assembly in accordance with the present invention is reduced. In addition, because only one threaded rod needs to be driven to actuate the assembly in accordance with the present invention to operate, the power consumption is also reduced and the power waste is prevented.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A tool holding and working piece-clamping assembly for a machine with a tool, the tool holding and working piece-clamping assembly comprising:

a stand with a top adapted to be securely connected to the machine;

a driving device mounted on the top of the stand;

a threaded rod rotatably mounted on the stand and driven by the driving device;

a rail assembly mounted on the stand and parallel to the threaded rod;

a brake post mounted on the stand and parallel to the threaded rod;

a working piece-clamping device with an upper clamping device slidably connected to the rail assembly and a lower clamping device corresponding to the upper clamping device and adapted to be secured on the machine, and the working piece-clamping device further comprising:

a connecting plate connected to the rail assembly;

an upper base attached to the connecting plate for the upper clamping device being attached to the upper base;

a contact switch with an actuating arm mounted on the connecting plate; and a brake electrically connected to the contact switch and slidably mounted on the brake post; and a tool holding device slidably connected to the rail assembly and comprising:

a connecting base slidably connected to the rail and screwed with the threaded rod;

at least one pushing block mounted on the connecting base and corresponding to the connecting plate;

an actuating block attached to the connecting base and aligning with the actuating arm of the contact switch; and a moving base attached to the connecting base, located between the upper clamping device and the lower clamping device and adapted for the tool being mounted on the moving base.

2. The tool holding and working piece-clamping assembly as claimed in claim 1, wherein the rail assembly comprises two rails attached to the stand and respectively located at two sides of the threaded rod.

3. The tool holding and working piece-clamping assembly as claimed in claim 2 further comprising an upper slider attached to each respective rail for the connecting plate being attached between the upper sliders.

4. The tool holding and working piece-clamping assembly as claimed in claim 2 further comprising a lower slider attached to each respective rail for the connecting base being attached between the lower sliders.

5. The tool holding and working piece-clamping assembly as claimed in claim 1 further comprising a housing for the stand secured thereto adapted be secured on the machine, wherein the housing has a window with a top end and a bottom end for the upper base and the moving base moveably extending through the window.

6. The tool holding and working piece-clamping assembly as claimed in claim 5, wherein the working piece-clamping device further comprises a lower base attached to the housing for the lower clamping device being mounted on the lower base.

7. The tool holding and working piece-clamping assembly as claimed in claim 6 further comprising a bellows shutter with two ends respectively attached to the top end of the window and the upper base.

8. The tool holding and working piece-clamping assembly as claimed in claim 6 further comprising a bellows shutter with two ends respectively attached to the upper base and the moving base.

9. The tool holding and working piece-clamping assembly as claimed in claim 6 further comprising a bellows shutter with two ends respectively attached to the moving base and the lower end of the window.

10. The tool holding and working piece-clamping assembly as claimed in claim 6 further comprising a first bellows shutter with two ends respectively attached to the top end of the window and the upper base;

a second bellows shutter with two ends respectively attached to the upper base and the moving base; and a third bellows shutter with two ends respectively attached to moving base and the lower end of the window.

* * * * *